United States Patent
Jeong et al.

(10) Patent No.: US 7,194,499 B2
(45) Date of Patent: Mar. 20, 2007

(54) PIPELINED DIVIDER AND DIVIDING METHOD WITH SMALL LOOKUP TABLE

(75) Inventors: Woong Jeong, Seoul (KR); Jong Chul Jeong, Seoul (KR); Woo Chan Park, Seoul (KR); Moon Key Lee, Kyonggi-do (KR); Tack Don Han, Seoul (KR)

(73) Assignee: Yonsei University, Seoul (KR)

( * ) Notice: Subject to any disclaimer, the term of this patent is extended or adjusted under 35 U.S.C. 154(b) by 560 days.

(21) Appl. No.: 10/231,566

(22) Filed: Aug. 30, 2002

(65) Prior Publication Data

US 2004/0024806 A1 Feb. 5, 2004

(30) Foreign Application Priority Data

Jul. 31, 2002 (KR) .......................... 10-2002-45232

(51) Int. Cl.
*G06F 7/52* (2006.01)
(52) U.S. Cl. .................................................. 708/653
(58) Field of Classification Search ................ 708/650, 708/653–656
See application file for complete search history.

(56) References Cited

U.S. PATENT DOCUMENTS 5,475,630 A * 12/1995 Briggs et al. ............... 708/654
6,782,405 B1 * 8/2004 Matula et al. .............. 708/504

OTHER PUBLICATIONS

Hung et al "Fast Division Algorithm with a Small Lookup Table", 1999 IEEE, pp. 1465-1468.*
"Composite Division Unit", IBM Tech. Disc. Bul., vol. 8, Issue 8, pp. 994-995, Jan. 1, 1967.*

* cited by examiner

*Primary Examiner*—Tan V. Mai
(74) *Attorney, Agent, or Firm*—Marshall, Gerstein & Borun LLP

(57) ABSTRACT

A pipelined divider with a small lookup table is disclosed. The pipelined divider can greatly reduce the size of a lookup table with a low cost to overcome the problems involved in the conventional pipelined divider requiring a large lookup table due to its iterative operation type. The pipelined divider has a delay time of 3 cycles in a single precision, and can reduce a chip size by about ⅓ in comparison to the existing pipelined divider.

8 Claims, 5 Drawing Sheets

| m | p | # of entry | q | ROM size (Byte) | remarks |
|---|---|---|---|---|---|
| 15 | 6 | 32 | 8 | 32 | |
| 16 | 6 | 32 | 9 | 36 | |
| ⋮ | ⋮ | ⋮ | ⋮ | ⋮ | |
| 23 | 7 | 64 | 14 | 112 | |
| 24 | 8 | 128 | 13 | 208 | single precision |
| 25 | 8 | 128 | 14 | 224 | |
| ⋮ | ⋮ | ⋮ | ⋮ | ⋮ | |
| 52 | 15 | 16K | 27 | 54K | |
| 53 | 15 | 16K | 28 | 56K | double precision |

FIG. 6

| | | prior art(P.Hung,s) | present unvention |
|---|---|---|---|
| general | Latency | 2 MUL or 1 MUL + 1 LUT | 1 LUT + 3 MUL |
| | Throughput | 1 cycle | 1 cycle |
| | LUT | 1(# of entry: $2^{m/2}$, bit-width: m+2) | Very smaller than Hung's |
| | MUL | 2 | 4 |
| single precision | Latency(ns) | 7.6 | 11.01 |
| | Latency(cycles) | 2 | 3 |
| | LUT | 13KB | 208B |
| | MUL | 26x26, 24x24 | 24x13,24x15,24x15,28x28 or 24x13,24x17,24x17,27x27 |
| double precision | Latency(ns) | implementation impossible (LUT이 440MB) | 8 |
| | LUT | | 56KB |
| | MUL | | 53x28,53x28,53x28,58x58 |

FIG. 7

| algorithm and implementation type | | latency | Pipeline-ability | Accurate remainder | # of iterations | Area | # of MULs | Size of LUT |
|---|---|---|---|---|---|---|---|---|
| SRT Radix-4 | | 12 | × | ○ | 12 | 1.5 | | |
| Newton-Raphson | 8b seed | 6 | × | × | 3 | 1.0 | 1 | 128B |
| | 16b seed | 4 | × | × | 2 | 22 | 1 | 64KB |
| Series expansion | 8b seed | 7 | × | × | 3 | 1.0 | 1 | 128B |
| | 16b seed | 5 | × | × | 2 | 22 | 1 | 64KB |
| Accurate quotient approximation | | 3 | × | ○ | 1 | 9.8 | 3 | 19.5KB |
| Hung's | | 2 | ○ | × | | 6.8 | 2 | 13KB |
| Proposed | | 3 | ○ | × | | 4.6 | 4 | 240B |

FIG. 8

| algorithm and implementation type | | latency | Pipeline-ability | Accurate remainder | # of iterations | Area | # of MULs | Size of LUT |
|---|---|---|---|---|---|---|---|---|
| SRT Radix-4 | | 27 | × | ○ | 27 | 1.5 | | |
| Newton-Raphson | 8b seed | 22 | × | × | 11 | 1.0 | 1 | 128B |
| | 16b seed | 16 | × | × | 8 | 22.0 | 1 | 64KB |
| Series expansion | 8b seed | 25 | × | × | 11 | 1.0 | 1 | 128B |
| | 16b seed | 19 | × | × | 8 | 22.0 | 1 | 64KB |
| Accurate quotient approximation | | 9 | × | ○ | 2 | 9.8 | 3 | 19.5KB |
| Hung's | | | | × | | | 2 | 440MB |
| Proposed | | 8 | ○ | | | 35.9 | 4 | 56KB |

PIPELINED DIVIDER AND DIVIDING METHOD WITH SMALL LOOKUP TABLE

This application claims the benefit of the Korean Application No. P2002-45232 filed on Jul. 31, 2002 which is hereby incorporated by reference.

BACKGROUND OF THE INVENTION

1. Field of the Invention

The present invention relates to an arithmetic and logical unit (ALU), and more particularly, to a pipelined divider with a small lookup table.

2. Discussion of the Related Art

Typically, a division operation in the ALU has the characteristic in that its frequency is relatively low in comparison to other arithmetic operations. Due to this characteristic, a divider has been designed to occupy a small installation area, and mostly implemented in an iterative manner. Accordingly, a delay time produced during performing the division operation is relatively long in comparison to that of other operations. In spite of the low frequency, the long delay time of the division operation greatly affects the whole system.

Recently, as the degree of integration of a very large scale integrated circuit (VLSI) becomes higher and the application fields that require a high performance become greater, a structure that performs a division without iteration has been proposed. Especially, a three-dimensional (3-D) graphic process has been highlighted as an important application of a processor, and a divider composed of pipelines having a high throughput becomes necessary to process 3-D graphics at a high speed.

Figure 1:
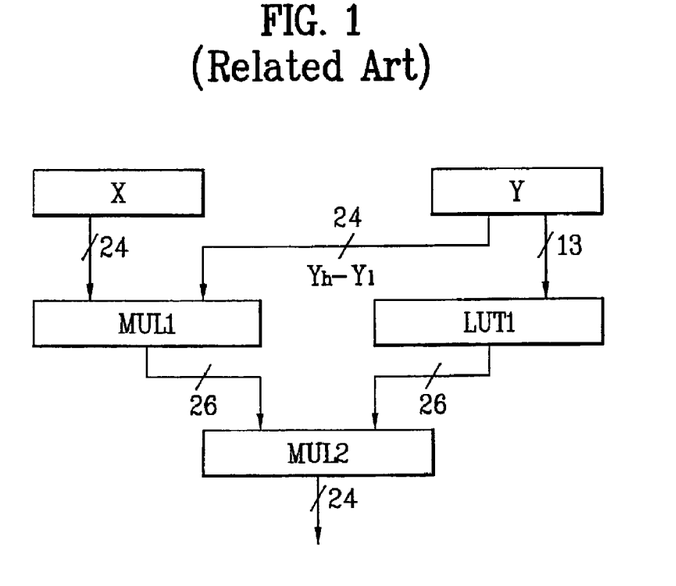
FIG. 1 is a block diagram of a conventional divider proposed by P. Hung.

FIG. 1 is a block diagram of a conventional divider proposed by P. Hung.

Referring to FIG. 1, P. Hung has proposed a pipelined divider by correcting the Taylor's-series expansion. According to this pipelined divider, up to second-order terms of the Taylor series of a reciprocal of a divisor Y are stored in one lookup table LUT1, and a division operation is performed with only twice multiplication using a lookup table reference and first and second multipliers MUL1 and MUL2. Thus, the divider can be constructed in the form of pipelines.

Figure 6:
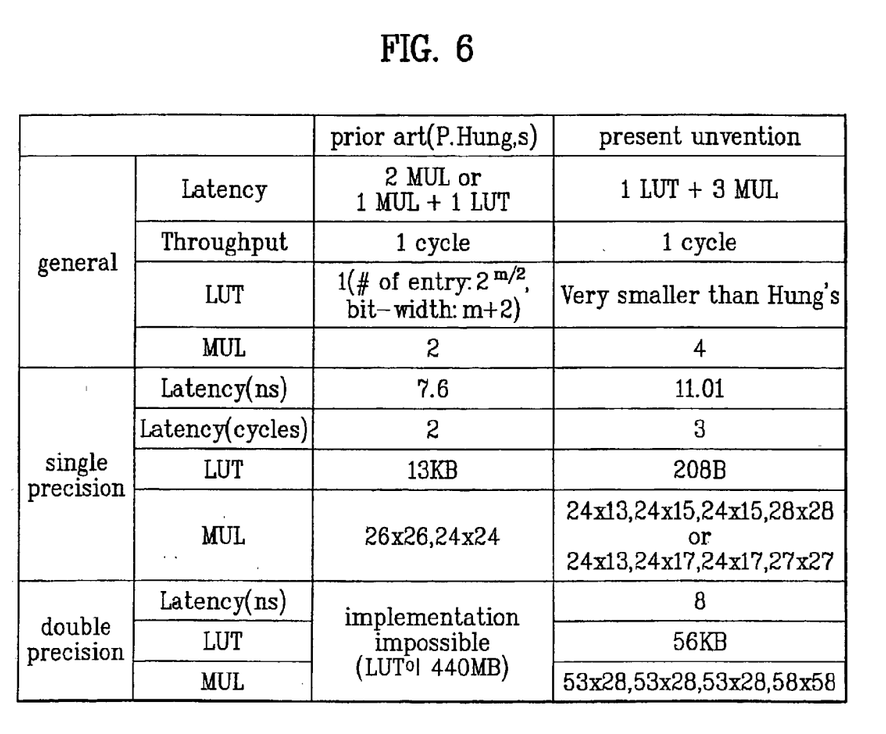
FIG. 6 is a comparative table of the conventional divider and the divider according to the present invention.

The divider of P. Hung has the advantage that it can somewhat reduce the size of the lookup table LUT1 in comparison to the existing system. However, as shown in FIG. 6, since this divider still requires a large-sized lookup table LUT1 (for instance, 13KB in a single precision, and 440 MB in a double precision), it has the disadvantage that it occupies a large chip area. Also, as the precision becomes higher, this problem becomes more strained.

Meanwhile, the existing divider may be briefly classified into a unit regression type such as a Sweeney-Robertson-Tocher (SRT) type and so on, and a multiplicative type.

The multiplicative type is a kind of approximation type, and uses multipliers and lookup tables. Two well-known algorithms among those using multipliers are a Newton-Raphson type algorithm and a series expansion type algorithm, and both of them calculate quotients by operating reciprocals brought from the lookup tables through the multipliers.

These methods have the disadvantage that they require a large-sized lookup table. For example, the divider of the Newton-Raphson type or the series expansion type having a 16-bit seed requires the lookup table size of 64KB in total. These methods can perform a division operation of the single precision through the twice iteration. In case of using a 8-bit seed, the size of the lookup table is small, i.e., of 128B, but the delay time greatly increases since a three-times iteration should be performed. An accurate quotient approximation method using the Taylor's series uses plural lookup tables, and requires lookup tables of 19.5KB in order to perform an operation of a single precision by once iteration. Here, the precision type follows the IEEE (Institute of Electrical & Electronics Engineers) standard, and is composed of a sign bit of one bit, an exponent part of 8 bits, and a fraction part of 23 bits. According to the normalized form of the fraction part, the most significant bit (MSB) is "1", but the MSB is omitted in the floating-point expression as a hidden bit.

A recently proposed divider provided with pipelines has either a structure proposed by A. Liddicoat or a structure proposed by P. Hung (See FIGS. 1 and 2).

The divider of A. Liddicoat calculates up to a three-order term of the Newton-Raphson algorithm, and reduces the delay time using parallelism.

The divider of P. Hung uses the Taylor's series expansion, and has the advantage in that its structure is simplified and the size of the lookup table is relatively small in comparison to the existing divider. According to the algorithm proposed by P. Hung, the division operation can be expressed by the following equation 1 through the Taylor's series expansion.

[Equation 1]

$$\frac{X}{Y} = \frac{X}{Y_h + Y_1} = \frac{X}{Y_h}\left(1 - \frac{Y_1}{Y_h} + \left(\frac{Y_1}{Y_h}\right)^2 - \cdots\right) \quad (1)$$

Here, $Y_h$ is a value of up to an upper p bit of Y, $Y_1$ is a value obtained by subtracting $Y_h$ from Y. X and Y are normalized fixed point numbers, and thus the respective values have the boundary condition of the equation 2.

[Equation 2]

$$1 \leq X, Y < 2$$
$$1 \leq Y_h < 2 - 2^{-p+1}$$
$$0 \leq Y_1 < 2^{-p+1}$$

(2)

By approximating only up to the second-order term of the Taylor's series in the equation 1, the following equation 3 is obtained.

[Equation 3]

$$\frac{X}{Y} \approx \frac{X(Y_h - Y_1)}{Y_h^2}$$

(3)

According to the equation 3, the division operation can be performed by multiplying the dividend X by $Y_h - Y_1$ obtained from the divisor Y, and then multiplying the multiplication result by $1/Y_h^2$. Here, it is possible to obtain $Y_h - Y_1$ by correcting the booth encoding of the multiplier MUL1 used for the multiplication of X by $Y_h - Y_1$ without the necessity of actually performing a subtraction.

As described above, the algorithm proposed by P. Hung approximates $1/Y_h^2$ using one lookup table LUK1. This algorithm can somewhat reduce the size of the lookup table in comparison to the existing algorithm. Nevertheless, the divider proposed by the P. Hung also has the disadvantage in that its chip area is still large in comparison to the divider implemented by the existing iterative algorithm. In case of the single precision of 32 bits, it occupies a lookup table area of about 13KB, and in case of the double precision of 64 bits, its implementation is actually impossible (See FIG. 6). Accordingly, it is a very important subject to reduce the size of the lookup table in a pipeline type divider.

SUMMARY OF THE INVENTION

Accordingly, the present invention is directed to a pipelined divider and a dividing method with a small lookup table that substantially obviate one or more problems due to limitations and disadvantages of the related art.

An object of the present invention is to provide a pipelined divider with a small lookup table that can greatly reduce the size of a lookup table, although a delay time is increased by one cycle, by correcting the conventional algorithm of the pipelined divider proposed by P. Hung.

Another object of the present invention is to provide a pipelined divider and a dividing method with a small lookup table that has a delay time of 3 cycles in a single precision, and can reduce the whole size by about 30% in comparison to the existing divider and dividing method proposed by P. Hung.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a pipelined divider with a small lookup table, includes a lookup table for storing an internal parameters, and calculating a value of $1/Y_h^2$ using a divisor Y, a first multiplier for operating an A divisor by multiplying the value of $1/Y_h^2$ of the lookup table by $Y_h-Y_1$ obtained from a dividend X and the divisor Y, second and third multipliers for outputting AX and AY by operating the A divisor, the dividend X, and the divisor Y, and a fourth multiplier for outputting a quotient Q by operating the AX and a bit-inverted 2−AY.

It is preferable that the multiplier is composed of one lookup table and four multipliers, a chip area of the lookup table is in linear proportion to a unit of byte, and a chip area of the multiplier is in linear proportion to a product of the bit numbers of a multiplier and a multiplicand.

In another aspect of the present invention, a pipelined dividing method with a small lookup table, includes the steps of preparing a normalized dividend X and a divisor Y, calculating $1/Y_h^2$ in a lookup table, calculating A by multiplying $1/Y_h^2$ by $Y_h-Y_1$, multiplying A by X and Y in parallel, and outputting a quotient Q by multiplying AX by 2−AY and then performing a round-to-nearest and a round-to-zero.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
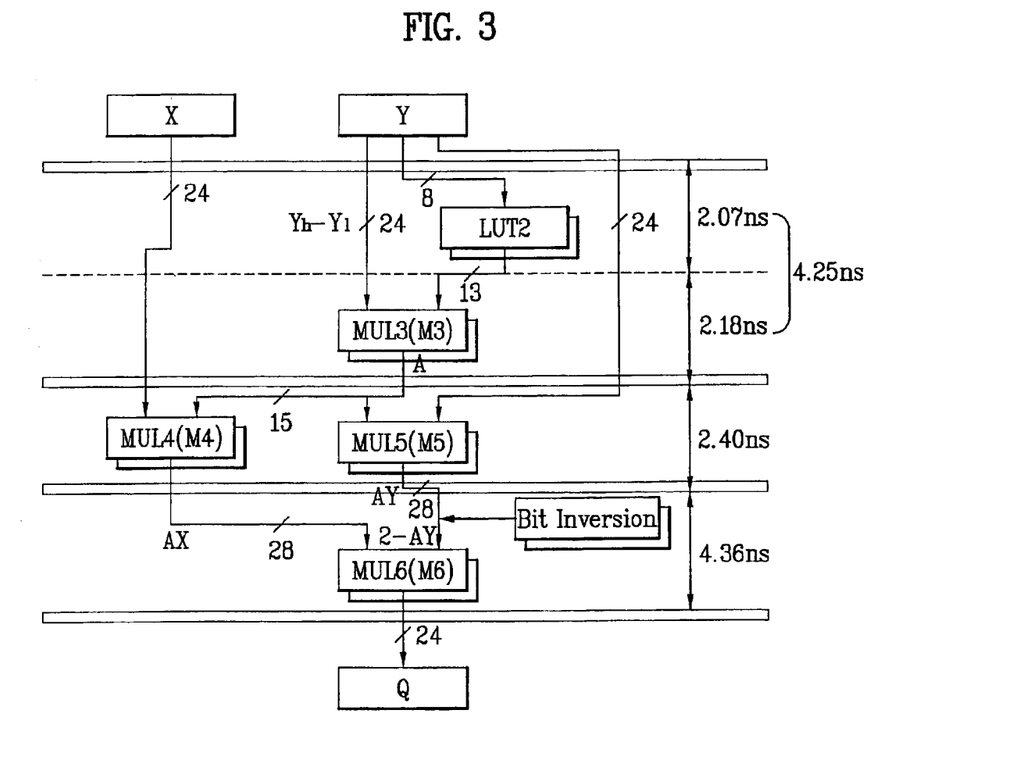
FIG. 3 is a block diagram of a pipelined divider according to the present invention.
Figure 4:
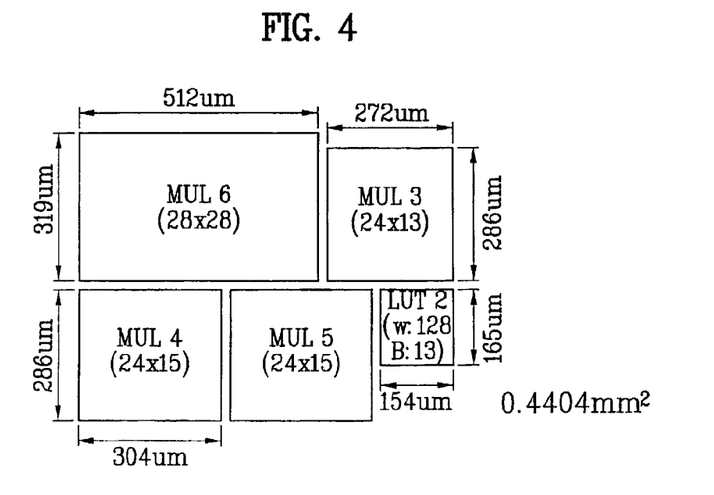
FIG. 4 is a layout diagram showing a chip size of the divider of FIG. 3.
Figure 5:
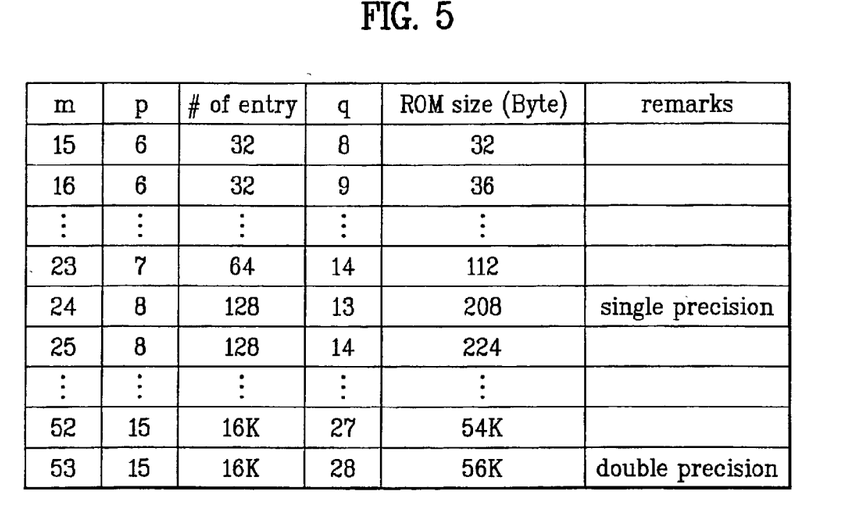
FIG. 5 is a table showing the size of the lookup table of the divider of FIG. 3.
Figure 7:
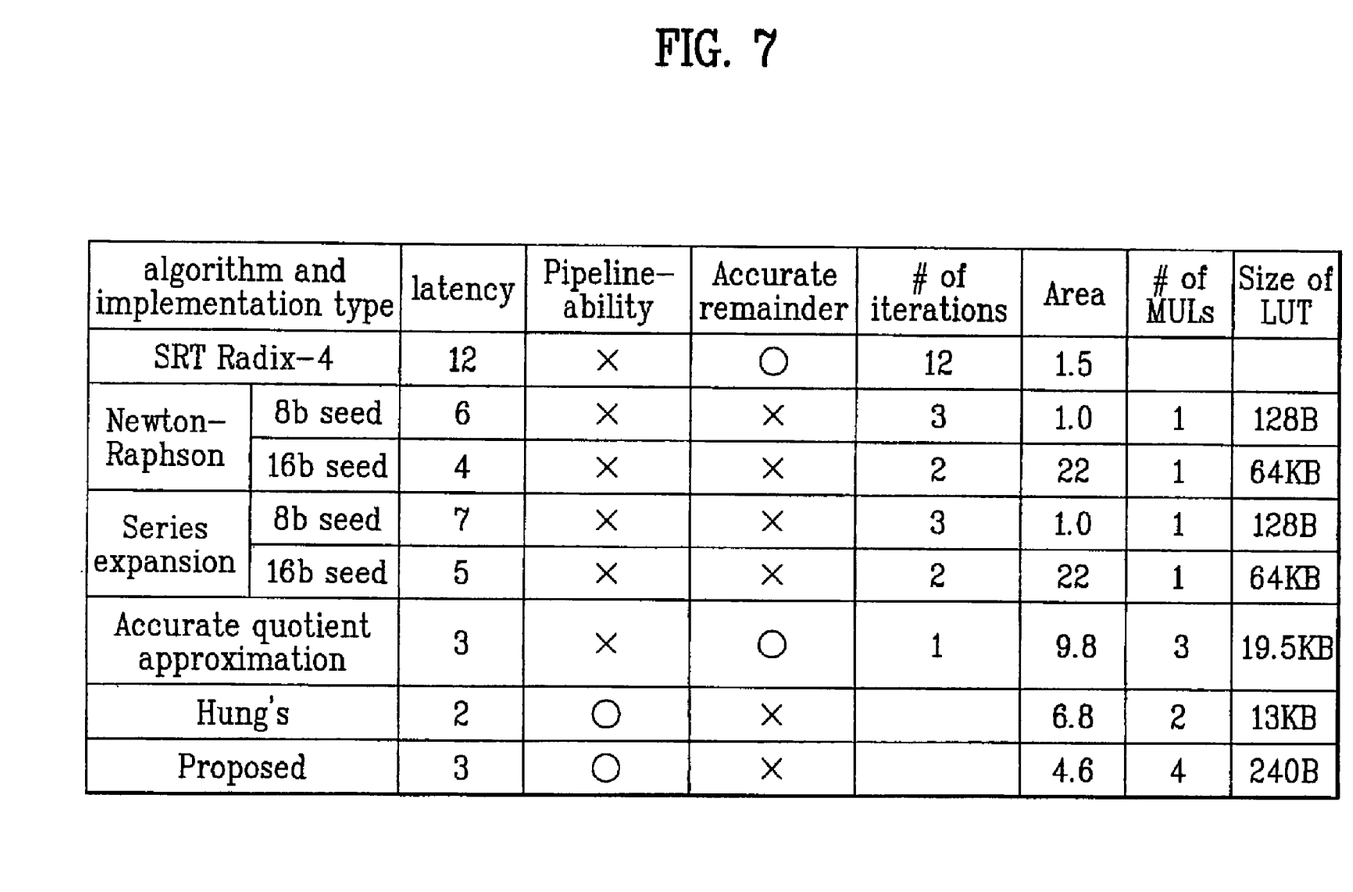
FIG. 7 is a comparative table of the divider in a single precision according to the present invention and other algorithms.
Figure 8:
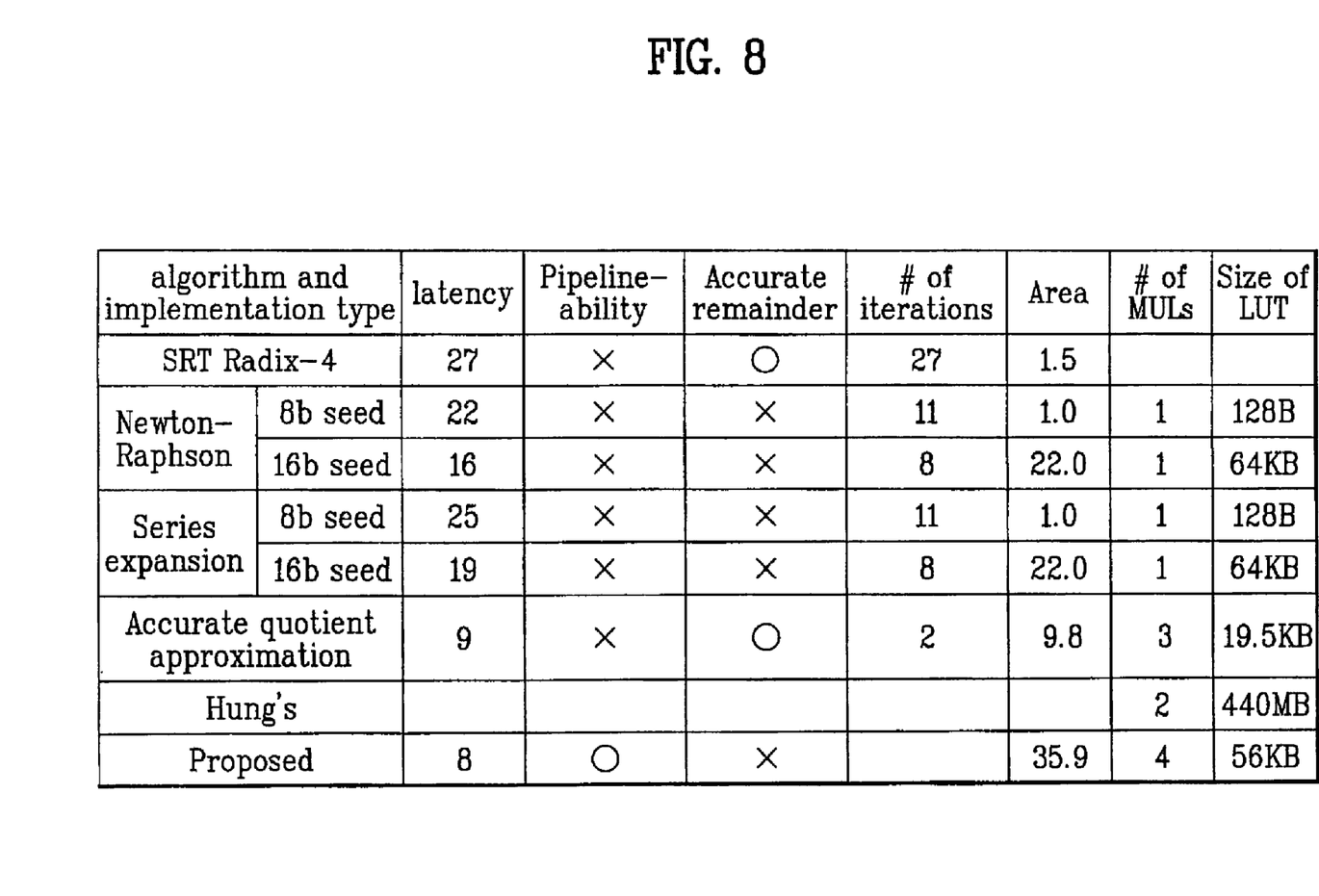
FIG. 8 is a comparative table of the divider in a double precision according to the present invention and other algorithms.

FIG. 3 is a block diagram of a pipelined divider according to the present invention. FIG. 4 is a layout diagram showing a chip size of the divider of FIG. 3, and FIG. 5 is a table showing the size of the lookup table of the divider of FIG. 3. FIG. 6 is a comparative table of the conventional divider and the divider according to the present invention. FIG. 7 is a comparative table of the divider in a single precision according to the present invention and other algorithms, and FIG. 8 is a comparative table of the divider in a single precision according to the present invention and other algorithms.

The subject of the present invention is to reduce the size of the lookup table, which is the greatest drawback of a non-iterative divider. If the same operation as the algorithm proposed by P. Hung is performed with a much smaller lookup table, a coarse quotient is calculated through the algorithm of P. Hung. A remainder is calculated through multiplication of the coarse quotient by the devisor and subtraction of the multiplied value from the dividend. Then, a final response can be calculated by once more performing the same operation as the algorithm of P. Hung with the remainder, and adding the quotients calculated through the twice operations.

Though this operation procedure looks very complicated, the operation can be performed with a lookup table having a size much smaller than that of the divider of P. Hung by one to several tens and four multipliers having a small precision if the redundant operation is removed through re-arrangement of the equation.

The algorithm proposed according to the present invention is as follows. By reducing the bit-width of $Y_h$ in the equation 3, the coarse quotient can be defined by the following equation 4.

[Equation 4] (4)
$$\tilde{Q} \approx \frac{X(Y_h - Y_1)}{Y_h^2}$$

The remainder value can be calculated by the following equation using the coarse quotient.

$$\tilde{X} \approx X - Y \cdot \tilde{Q}$$

The final quotient is obtained through performing of the same calculation as the equation 4 with respect to the remainder value and then adding of the two responses together.

$$\tilde{\tilde{Q}} \approx \frac{\tilde{X}(Y_h - Y_1)}{Y_h^2}$$

$$\frac{X}{Y} \approx \tilde{Q} + \tilde{\tilde{Q}}$$

The above equation can be arranged as

[Equation 5] (5)
$$\frac{X}{Y} \approx \tilde{Q} + \tilde{\tilde{Q}}$$
$$= \frac{(X + \tilde{X})(Y_h - Y_1)}{Y_h^2}$$
$$= (X + \tilde{X})A$$
$$= (2X - Y\tilde{Q})A$$
$$= (2X - AYX)A$$
$$= (2 - AY)AX$$

In the equation 5, the A value is as follows.

$$A = \frac{(Y_h - Y_1)}{Y_h^2}$$

A hardware block diagram implemented based on the equation 5 calculated as above is illustrated in FIG. 3. Referring to FIG. 3, the divider according to the present invention includes a lookup table LUT2 for storing an internal parameters, and calculating a value of $1/Y_h^2$ using the divisor Y, a first multiplier MUL3 for operating an A divisor by multiplying the value of $1/Y_h^2$ of the lookup table LUT2 by $Y_h-Y_1$ obtained from a dividend X and the divisor Y, second and third multipliers MUL4 and MUL5 for outputting AX and AY by operating the A divisor, the dividend X, and the divisor Y, and a fourth multiplier MUL6 for outputting a quotient Q by operating the AX and a bit-inverted 2-AY.

The divider as constructed above operates by four steps in accordance with the equation 5.

At a first step, $1/Y_h^2$ is calculated in the lookup table LUT2, and at a second step, A is calculated by multiplying $1/Y_h^2$ by $Y_h-Y_1$. At a third step, AX and AY are calculated in parallel by multiplying A by X and Y, respectively. At a fourth step, a final equation is obtained. Here, the value of 2-AY can be obtained by performing a bit-inversion of AY. For example, the bit-inversion of 1.00101 becomes 0.11010, and this value is smaller than 0.11011, which is obtained by subtracting 1.00101 from 2, by 1 ulp (unit in the last position, the weight of the least significant bit).

Here, in case of using the bit-inversion, adders can be removed in comparison to the actual performing of subtraction, but an error value is added. It will be explained in detail how this error value affects the division operation.

For performing the algorithm of the divider according to the present invention are required one lookup table and four multipliers. Here, since the two multiplications can be performed in parallel, the latency will be 1 LUT+3 MUL. Three of the four multipliers have a small bit-width of the multiplier in comparison to those in FIG. 1, and thus the area and the delay time can be greatly reduced. In case of the single precision, the multiplier of the final stage is of 28×28, but the three remaining multipliers are of 24×15, 24×15 and 24×13. Also, since the size of the lookup table is very small, and the value of the lookup table can be brought in a very short time. Accordingly, in case of the single precision, the divider can perform the division operation within three cycles. At the first step, A is calculated through reading out from the lookup table and performing of the multiplication, and at the second step, two multiplications are performed in parallel. At the third step, the final multiplication is performed to process the division operation.

In FIG. 4, delay times of the respective function units are presented based on the compiled macro of the Samsung 0.25 μm ASIC (Application-Specific Integrated Circuit) process. The bit-widths of the respective multipliers, the entry number of the lookup table, and the bit-widths of the respective words are presented through the following error analysis.

Error Analysis

The proposed error analysis of the algorithm is the most basis of the divider design, and this is because the error analysis provides basic data for determining the size of the lookup table and the bit-width of the multiplier. Also, through the error analysis, the division algorithm can be compared with other division algorithms.

During the error analysis for the algorithm proposed according to the present invention, 4 items should be considered in total. First is an error caused by the entry limitation of the lookup table, and this error is produced because the bit length of $Y_h$ is limited to p bits.

Since the equation 5 is under the assumption that the multiplier and the lookup table have an infinite precision, it can be assumed that there is no error except for the error caused by the limitation of the lookup table in the equation 5. Thus, the first error can be obtained by subtracting the equation 5 from the ideal quotient. The second error is an error caused by the bit-width of the lookup table, and the maximum value of this error is determined by the precision of the lookup table. The third error is an error caused by rounding, and this error is also determined by the precision of the multiplier. The final error is an error caused by the bit-inversion, and this error always has a value of 1 ulp.

The error caused by the entry limitation of the lookup table is as follows.

The number of entries of the lookup table is determined by the bit-width of $Y_h$, and since $Y_h$ is normalized, the number of entries will be $2^{-p+1}$. The error is produced due to the limited number of entries. This error can be calculated by subtracting from the ideal quotient the quotient when it is assumed that the bit numbers of X and Y are infinite in the proposed algorithm and the multipliers also have an infinite precision.

[Equation 6] (6)

$$E_{Table\_entry} = \frac{X}{Y} - (2 - AY)AX$$

$$= X\left\{\frac{1}{Y} - \frac{Y_h - Y_1}{Y_h^2}\left(2 - \frac{Y_h - Y_1}{Y_h^2}Y\right)\right\}$$

$$= X\left\{\frac{1}{Y} - \frac{Y_h - Y_1}{Y_h^2}\left(2 - \frac{Y_h^2 - Y_1^2}{Y_h^2}\right)\right\}$$

$$= X\left\{\frac{1}{Y} - \frac{Y_h - Y_1}{Y_h^2}\frac{Y_h^2 + Y_1^2}{Y_h^2}\right\}$$

$$= X\left\{\frac{Y_h^4 - Y(Y_h - Y_1)(Y_h^2 + Y_1^2)}{YY_h^4}\right\}$$

$$= \frac{X}{Y}\left\{\frac{Y_h^4 - (Y_h^2 - Y_1^2)(Y_h^2 + Y_1^2)}{Y_h^4}\right\}$$

$$= \frac{X}{Y}\frac{Y_1^4}{Y_h^4}$$

In accordance with the boundary condition of the equation 2, the maximum value of the error caused by the entry limitation is given by the following equation 7.

[Equation 7] (7)

$$E_{Table-entry}\ MAX = \frac{X}{Y}\frac{Y_1^4}{Y_h^4}\bigg|_{\substack{X,Y=MAX \\ Y,Y_h=MIN}}$$

$$< 2 \cdot 2^{-4p+4}$$

$$= 2^{-4p+5}$$

Also, the equation 5 can be expressed by the following equivalent equation using the equation 6.

[Equation 8] (8)

$$\frac{X}{Y} \approx (2 - AY)AX = \frac{X}{Y}\left(1 - \frac{Y_1^4}{Y_h^4}\right)$$

The error caused by the limited bit-width of the lookup table is as follows.

The bit-width of the lookup table should be limited to fixed bits. An error is produced due to this, and this error value should be made always a negative number. The reason is that since other errors are positive numbers, the whole error can be reduced through determination of the error caused by the bit-width limitation of the lookup table to be the negative number. If it is assumed that the bit-width of the lookup table is q, the value stored in the lookup table is a result of rounding a value up to an upper q bit of the value of $1/Y_h^2$. The rounding mode will be a round-to-plus-infinity. If the round-to-plus-infinity is determined, the rounding is performed except the case that both a round bit and a sticky bit are "0", and thus the error value always becomes a number that is not positive.

$$-2^{-q+1} < E_{Table-bitwidth} \leq 0 \quad (9)$$

The error caused by the rounding of the multiplier is as follows.

The algorithm according to the present invention uses 4 multipliers in total. The rounding should be performed at a fixed position with respect to the result of multiplication. Otherwise, the bit-width is lengthened double whenever the multiplication is once performed, and this causes a big problem in area and performance. In case of making the rounding mode of the multiplier a round-to-nearest, the maximum error value can be reduced, but adders should be installed at the output terminal of the multiplier. In order to remove the adders for rounding, the rounding mode of the respective multipliers is determined to be a round-to-zero. According to the round-to-zero, the result of rounding is always a round down, and no separate hardware for rounding is required. If the resultant value is presented up to M1, M2, M3, and M4 bits, respectively, the error will be given by the following equation 10.

[Equation 10]

$$0 \leq E_{M1} < 2^{-M1+1}$$

$$0 \leq E_{M2} < 2^{-M2+1}$$

$$0 \leq E_{M3} < 2^{-M3+1}$$

$$0 \leq E_{M4} < 2^{-M4+1} \quad (10)$$

The error caused by the bit-inversion is as follows.

When the multiplier calculates 2−AY, the bit-inversion is performed without performing the subtraction operation, and thus the error of 1 ulp is always produced. This value is determined by the bit-width of the resultant value of the M3 multiplier.

[Equation 11]

$$E_{bit-inversion} = 2^{-M3+1} \quad (11)$$

The addition of the respective errors is as follows.

In order to calculate the whole error that includes the above-described error terms, it should be observed on which parts of the operation performing process errors are produced and accumulated. If the maximum value of the whole error is calculated, the entry number and the bit-width of the lookup table, and the bit-widths of the respective multipliers can be determined.

The term of $1/Y_h^2$ in the equation 5 includes the error caused by the limited entry number of the lookup table, and thus when the A value is calculated, the error caused by the limited bit-width of the lookup table and the error caused by the rounding of the M1 multiplier are produced. When AX is calculated, the error caused by the rounding of the M2 multiplier is produced, and when AY is calculated, the error caused by the rounding of the M3 multiplier is produced. When 2−AY is calculated, the error caused by the bit-inversion is produced, and when AX(2−AY) is finally calculated, the error caused by the rounding of the M4 multiplier is produced.

The error caused by the limited bit-width of the lookup table and the error caused by the rounding of the M1 multiplier, which are produced when A is calculated, are expressed by the following equation.

$$[A]_{include-error} = \left(\frac{1}{Y_h^2} - E_{Table-bitwidth}\right)(Y_h - Y_l) - E_{M1}$$

$$= A - E_{Table-bitwidth}(Y_h - Y_l) - E_{M1}$$

In the same manner, other terms are expressed by the following equations.

$$[AX]_{include-error} = [A]_{include-error}X - E_{M2}$$
$$= AX - E_{Table-bitwidth}(Y_h - Y_l)X - E_{M1}X - E_{M2}$$

$$[AY]_{include-error} = [A]_{include-error}Y - E_{M3}$$
$$= AY - E_{Table-bitwidth}(Y_h - Y_l)Y - E_{M1}Y - E_{M3}$$

$$[2 - AY]_{include-error} = 2 - AY + E_{Table-bitwidth}(Y_h - Y_l)Y + E_{M1}Y + E_{M3} - E_{bit-inversion}$$

On the basis of the respective terms, the quotient that includes the error is calculated by the following equation.

$$[Q]_{include-error} = (AX - E_{Table-bitwidth}(Y_h - Y_l)X - E_{M1}X - E_{M2}) \times (2 - AY + E_{Table-bitwidth}(Y_h - Y_l)Y + E_{M1}Y + E_{M3} - E_{bit-inversion}) - E_{M4}$$

The term where the errors are multiplied together has a very small values, and thus can be disregarded.

$$[Q]_{include-error} \approx Q - E_{Table-entry} + E_{Table-bitwidth}(AXY(Y_h - Y_l) - X(2-AY)(Y_h - Y_l) + E_{M1}(AXY - X)(2-AY)) - E_{M2}(2-AY) + AXE_{M3} - AXE_{bit-inversion} - E_{M4}$$

In the above equation, the second-order term of the error is removed for approximation, and AX(2−AY) is replaced by Q-Etable-entry. The whole error of the above equation is calculated by the following equation.

$$E_{Total} \approx E_{Table-entry} + E_{Table-bitwidth}(2X(Y_h - Y_l)(1-AY)) + E_{M1}(2X(1-AY)) + E_{M2}(2-AY) - E_{M3}AX + AXE_{bit-inversion} + E_{M4}$$

In the above equation, if $(Y_h^2 - Y_1^2)/Y_h^2$ is substituted for AY, the following equation is obtained.

[Equation 12]

$$E_{Total} \approx E_{Table-entry} + E_{Table-bitwidth} 2X \frac{Y_l^2}{Y_h^2}(Y_h - Y_l) + E_{M1}\left\{2X\frac{Y_l^2}{Y_h^2}\right\}$$
$$+ E_{M2}\frac{Y_h^2 + Y_l^2}{Y_h^2} - E_{M3}X\frac{Y_h - Y_l}{Y_h^2} + E_{bit-inversion}X\frac{Y_h - Y_l}{Y_h^2} + E_{M4} \quad (12)$$

In the equation 12, $E_{table-entry}$, $E_{bit-inversion}$, $E_{M1}$, $E_{M2}$, $E_{M3}$, and $E_{M4}$ are positive errors, and $E_{table-bitwidth}$ is negative error. Since only the term $E_{M3}$ among several terms of the equation 12 has the negative (−) sign, the positive maximum error is produced when $E_{M3}$ and Etable-bitwidth have the minimum value and other error terms have the maximum values, while the negative maximum error is produced when $E_{M3}$ including $E_{table-bitwidth}$ has the maximum value and other error terms have the minimum values. By substituting the equations 7, 9, 10 and 11 in the equation 12 and approximating it with X=2, Y=1, $Y_1^2/Y_h^2 = 2^{-p+2}$, the following expression is obtained.

$$-(2^{-2p-q+5} + 2^{-M3+2}) < E_{Total} < 2^{-4p+5} + 2^{-2p-M1+5} + 2^{-p-M2+3} + 2^{-M2+1} + 2^{M3+2} + 2^{-M4+1}$$

The maximum allowable error value is changed according to the precision of the number system and the accuracy of the rounding. For an accurate rounding, the calculation should be performed with at least double the precision, or an additional operation is required. This causes a difficult problem in the approximation type operation such as the multiplicative type operation. In the structure proposed according to the present invention, if it is assumed that the error of 1 ulp is permitted, the maximum error has the following allowable limit.

[Equations 13 & 14]

$$2^{-4p+5} + 2^{-2p-M1+5} + 2^{-p-M2+3} + 2^{-M2+1} + 2^{-M3+2} + 2^{-M4+1} < 2^{-m+1} \quad (13)$$

$$2^{-2p-q+5} + 2^{-M3+2} < 2^{-m+1} \quad (14)$$

In the above equations, m is a number determined by the specification of the system that intends to apply it as the bit number which means the precision in the given number system, and p, q, M1, M2, M3, and M4 are numbers to be determined.

Next, the entry number and the bit-width of the lookup table are determined as follows.

In the equation 12, p, q, M1, M2, M3, and M4 become the factors that determine the size of the lookup table and multipliers that constitute the divider proposed according to the present invention. Among these numbers, p is the address bit number for the lookup table reference. Since p is a base number that is highest and dominant among several parameters in the equation 13, it should be first determined. Especially, since the entry number of the lookup table is increased double when p is increased by 1, the parameters should be determined so that the p value becomes minimum. In case of the system having the signal precision, m is 24, and thus p can be determined to be 8 by the equation 12. FIG. 5 shows values of p according to values of m. In FIG. 5, the entry number is also shown. Since Y is normalized, the entry number becomes $2^{p-1}$. The bit-width q of the lookup table can be determined by the equation 14 after p is determined, and the size of the M3 multiplier is determined by this value q. The value of q should be determined in consideration of the value of M5, and diverse variations thereof are possible. In case that $2^{-2p-q+5} \leq 2^{-M3+2}$, it has been known by analysis that the area is somewhat increased in comparison to the opposite case. In the present invention, if it is assumed that $2^{-2p-q+5} > 2^{-M3+2}$, the value of q is determined by the following expression.

$$2^{-2p-q+5} \leq 2^{-m}$$

The values of p and q determined through the above-described process are shown in FIG. 5.

Next, the rounding positions of the multipliers are determined.

M1, M2, M3, and M4 are bits for determining the rounding positions of the respective multipliers. Among these parameters, M1 is the parameter for determining the sizes of the MUL4 multiplier and the MUL5 multiplier, and M2 and M3 are the parameters for determining the size of the MUL6 multiplier. M4 is a resultant value of the divider, and thus is a fixed number. Accordingly, M1 should be preferentially determined among the four parameters, and then M2 and M3 should be determined.

In the proposed structure, in case of the single precision, when p=8 and q=13, it can be determined that M1=15, M2=28, M3=28, and M4=25. If it is determined as above, the sizes of the respective multipliers that constitute the divider proposed in the system of the single precision become 24×13, 24×15, 24×15, and 28×28, respectively. The entry number of the lookup table becomes 128, and the bit-width of the respective words becomes 13 bits.

Next, the algorithm according to the present invention will be explained in comparison with the algorithm of P. Hung.

The algorithm of P. Hung (See FIG. 1) has the latency of 1 LUT+1 MUL if the lookup table is in a critical path, while if not, it has the latency of 2 MUL. The latency of the multiplier is linearly increased as the required precision is increased. On the contrary, the latency of the lookup table is increased in a manner of geometrical series. Accordingly, in case of the low precision, 2 MUL becomes the whole latency, and in case of the high precision, the whole latency becomes 1 LUT+1 MUL. In case of the single precision, the latency of the lookup table is shorter than that of the multiplier, and thus the whole latency becomes 2 MUL. In case of the double precision, the latency of the lookup table is much longer than that of the multiplier, and thus the whole latency becomes 1 LUT+1 MUL.

However, the latency of the algorithm according to the present invention is 1 LUT+3 MUL. Since the size of LUT is much shorter than that of the algorithm proposed by P. Hung and two of the three multipliers have a small bit-width of the multiplier, the latency is relatively short. Actually, in case of the single precision, the latency is somewhat longer than that of the Hung's algorithm, but in case of the double precision, the latency is much shorter than that of the Hung's algorithm.

The two algorithms are both pipeline-able type, and in case that the stages are discriminated by a pipeline register, both of them have the throughput of 1 cycle. In this case, the latency should be calculated again in the unit of a cycle. If it is assumed that 28×28 multipliers are put in one stage, the latency in the single precision is 2 cycles in case of the Hung's algorithm, but 3 cycles in case of the algorithm proposed according to the present invention. If it is assumed that the 53×28 multiplier refers to 2 cycles and the 58×58 multiplier refers to 3 cycles in case of the double precision, the latency of the proposed algorithm according to the present invention is 8 cycles, but the implementation of the Hung's algorithm itself becomes impossible since the size of the lookup table is increased in a manner of geometrical series.

Figure 2:
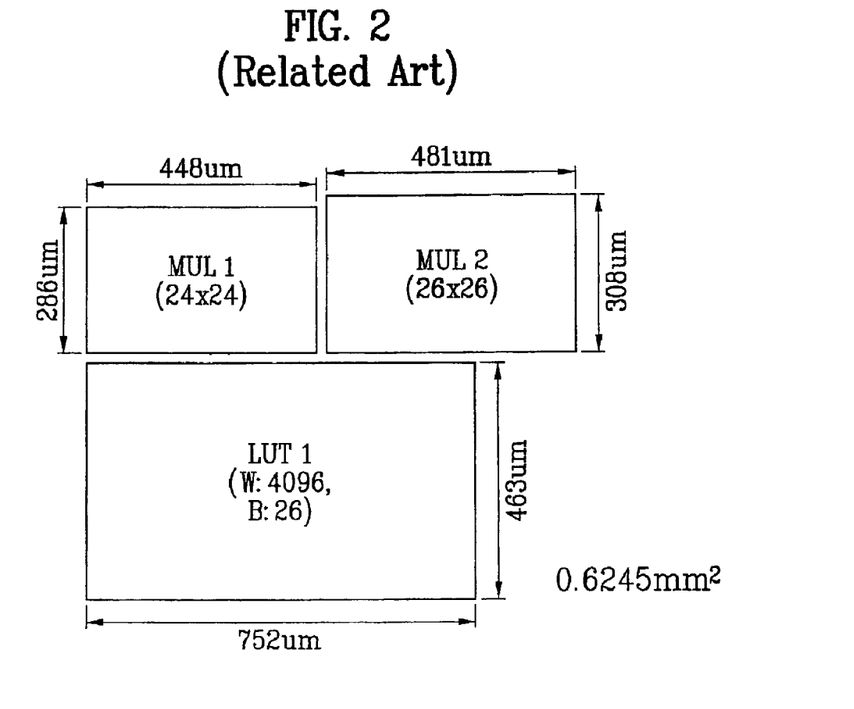
FIG. 2 is a layout diagram showing a chip size of the divider of FIG. 1.

FIGS. 2 and 4 show the occupied areas of the two algorithms in the single precision calculated based on a specified ASIC technology library to compare the occupied areas of the two algorithms. In FIGS. 2 and 4, the two algorithms are prepared in a state that the occupied area of flip-flops required during pipelining is excluded. As a result of comparing the two algorithms, the proposed algorithm according to the present invention has an area reduction of about 30% in comparison to the Hung's algorithm. The comparison of the proposed algorithm with the Hung's algorithm is illustrated in FIG. 6.

In case of the occupied area, as the precision of the data to be processed becomes higher, the proposed algorithm according to the present invention becomes more advantageous. This is because the area of the multiplier is linearly increased as the precision is increased, but the area of the lookup table is increased in a manner of geometrical series as the precision is increased.

Next, diverse comparisons of the dividing algorithm proposed according to the present invention with the existing representative dividing algorithm will be explained.

Such comparisons are very important, but considerably difficult. Specifically, since diverse blocks are entered into the respective algorithms, and the area and the latency are changed according to the precisions of the algorithms, it is not easy to compare the areas under a fixed basis. It is also difficult to compare the latencies. Though an accurate comparison is impossible, a brief comparison having the error to some extent is possible and necessary. For this comparison, the following is assumed.

(1) Among several precisions, the comparison is performed only in the single precision and in the double precision.

(2) The latency is calculated in the unit of a cycle.

(3) The third multiplier MUL3, i.e., 28×28 multiplier M3 operates in one cycle, and the multiplier having a latency longer than that of the third multiplier or the lookup table operates in two or three cycles.

(4) The area of the first multiplier MUL1, i.e., 24×24 multiplier M1 and the lookup table of 4KB is determined "1" as a basic unit of the area calculation.

(5) The area of the multiplier is in linear proportion to the product of the bit numbers of the multiplier and the multiplicand.

(6) The area of the lookup table is in linear proportion to a byte unit.

(7) The area of the SRT (Sweeney-Robertson-Tocher) divider is obtained using the value by the analysis of P. Soderquist.

(8) The compensation for the non-linearity of the lookup table is performed using the value by the analysis of P. Soderquist.

(9) A control unit or rounding circuit is excluded from the area calculation.

The assumption in the term (4) is based on a point that the 24×24 multiplier M1 and the lookup table of 4KB occupy the almost similar area on the library where the area comparison was made in FIGS. 2 and 4.

The assumption in the terms (5) and (6) is the assumption that a considerable error is produced. In case of the multiplier, the difference of bit-width is not great, and thus the error is not so large. However, in case of the lookup table, its size is diversely changed in the range of 128B to 64 KB, the-error is greatly produced, and this error should be compensated for P. Sderquist has explained that there is a 22-times difference between the series expansion type having an initial value of 8 bits and the series expansion type having an initial value of 16 bits. Accordingly, the present invention adopts the assumption of the item (8) to calculate the chip area accordingly.

FIG. 7 shows the comparison result of the respective algorithms in the single precision, and FIG. 8 shows the comparison result of the respective algorithms in the double precision. In FIGS. 7 and 8, the latency is calculated and the number of function units is determined based on the comparison of the dividing operation algorithms in the Newton-Raphson type or the series expansion type having the 16-bit seed.

Especially, the accurate quotient approximation algorithm is calculated based on the type of using two lookup tables. In case of the single precision, the proposed algorithm according to the present invention occupies the smallest area among the algorithms whereby the latency is within 5 cycles. Thus, in case of applying to the system that requires a short latency, it can be efficiently used. Especially, in case that the frequency of division is high, it can be effectively used due to its characteristic having a high throughput. However, the proposed algorithm according to the present invention has a low efficiency in the system having the low frequency of division from the viewpoint that the proposed algorithm occupies a wider area than the SRT radix-4 algorithm or Newton-Raphson type or series expansion type algorithm having the 8-bit seed. In case of the double precision, the proposed algorithm has the chip area and the performance more superior to those of P. Hung's algorithm, but its area is too large in comparison to the remaining algorithms. However, it can be effectively used in case that a high throughput is required.

As a result, the algorithm proposed according to the present invention can be effectively used in case that a high throughput is required both in the single precision and the double precision. In case of the single precision, the proposed algorithm can reduce the latency of operation with the chip area reduced even if a high throughput is not required.

As described above, the pipelined divider and dividing method with a small lookup table according to the present invention have the following effects.

First, it implements a new algorithm for performing a division operation in the form of pipelines without iteration during the division operation.

Second, in case of the single precision, it comprises four multiplier and one lookup table, and thus can reduce the area more than the existing pipelined division algorithm.

Third, it can be used in a system having a high frequency of division such as a three-dimensional graphic accelerator.

Fourth, interpretive error analyses using equations and simulation using a language of an upper level have been performed.

Fifth, it can be implemented using HDL in operation, and hereafter will be able to be implemented through simulation and synthesis of a gate level.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A pipelined divider, comprising:
    a lookup table for storing internal parameters and a value of $1/Y_h^2$ obtained from a divisor Y;
    a first multiplier for operating a divisor A by multiplying the value of $1/Y_h^2$ by a value of $Y_h-Y_1$ obtained from the divisor Y;
    second and third multipliers for operating values of AX and AY by multiplying the divisor A by a dividend X and the divisor Y in parallel, respectively; and
    a fourth multiplier for operating a quotient Q by multiplying the value of AX by a bit inverted 2–AY, wherein the $Y_h$ is a value of an upper bit of the divisor Y, and wherein the $Y_1$ is a value obtained by subtracting the $Y_h$ from the divisor Y.

2. The pipelined divider as claimed in claim 1, wherein the internal parameters include a bit number specifying a precision (m), an address bit number (p) of the lookup table, a bit-width of the lookup table (q), an entry number of the lookup table, and a ROM size.

3. The pipelined divider as claimed in claim 1, wherein the entry number of the lookup table is $2^{p-1}$, wherein p is the address bit number.

4. The pipelined divider as claimed in claim 1, wherein 2–AY is obtained by performing a bit-inversion of AY calculated through the third multiplier.

5. The pipelined divider as claimed in claim 1, wherein the divider is composed of one lookup table and four multipliers.

6. The pipelined divider as claimed in claim 1, an area of the lookup table is in linear proportion to a byte unit.

7. The pipelined divider as claimed in claim 1, wherein the first to fourth multipliers operate in one cycle, and the lookup table operates in two or three cycles.

8. The pipelined divider as claimed in claim 7, wherein chip areas of the first to fourth multipliers are in linear proportion to a product of the bit numbers of a multiplier and a multiplicand.

* * * * *